United States Patent [19]
Robinson

[11] Patent Number: 4,705,063
[45] Date of Patent: Nov. 10, 1987

[54] MOTOR OPERATED VALVE ASSEMBLY

[75] Inventor: James L. Robinson, Florence, Ky.

[73] Assignee: The Fulflo Specialties Co., Inc., Blanchester, Ohio

[21] Appl. No.: 924,792

[22] Filed: Oct. 30, 1986

[51] Int. Cl.$^4$ .......................... F16K 31/04; F16K 5/08
[52] U.S. Cl. ................. 137/315; 251/129.12; 251/285; 403/380; 403/337; 403/98
[58] Field of Search ................ 251/129.11, 129.12, 251/285, 59, 286, 292; 137/315; 403/380, 337, 98

[56] References Cited

U.S. PATENT DOCUMENTS

| | | | |
|---|---|---|---|
| 2,152,651 | 4/1939 | Kinzie et al. | 251/59 |
| 3,387,748 | 6/1968 | Brenchley | 251/129.11 X |
| 4,313,595 | 2/1982 | Markley et al. | |
| 4,407,326 | 10/1983 | Wilhelm | 251/129.12 X |
| 4,629,157 | 12/1986 | Tsuchiya et al. | 251/292 X |

FOREIGN PATENT DOCUMENTS 703133  2/1931  France .................... 403/337

Primary Examiner—Arnold Rosenthal
Attorney, Agent, or Firm—Wood, Herron & Evans

[57] ABSTRACT

A motor operated valve which includes a valve actuated by rotation of the valve stem, a rotary electric motor supported on the valve by a bracket which maintains the motor shaft and valve stem in axial alignment, and a two-piece coupling for drivably connecting the motor shaft and valve stem together. The two pieces of the coupling are angularly adjustable so that the relationship of the initial angular orientations of the motor shaft and of the valve stem can be set without disassembly of the valve or removal of the motor cover. The two pieces of the coupling abut through opposed toothed circular surfaces which rotate with respect to each other and bolt together to lock the coupling in the desired position.

7 Claims, 4 Drawing Figures

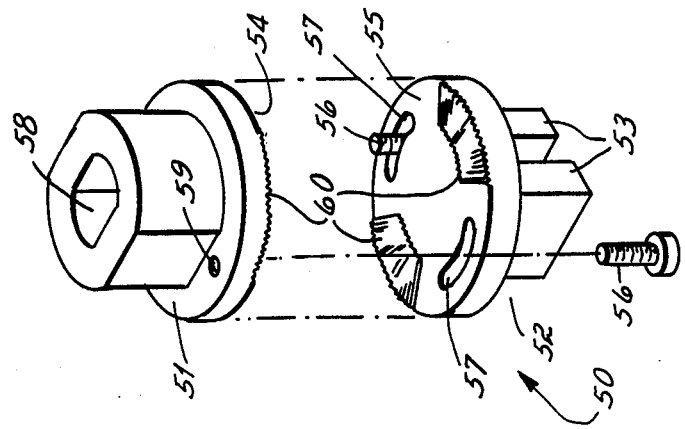
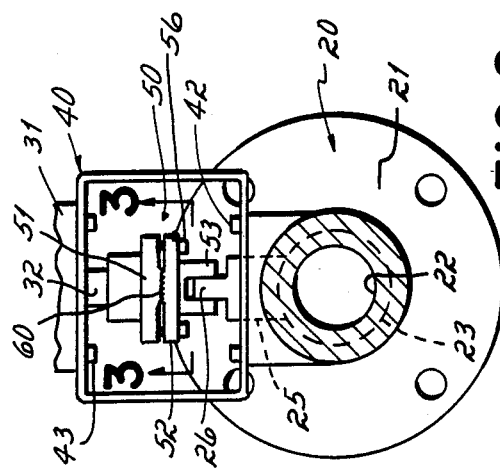
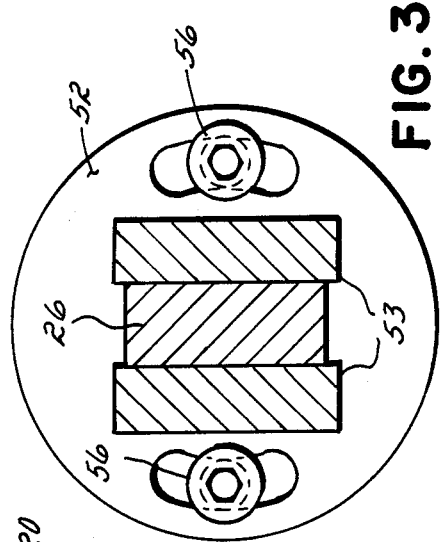
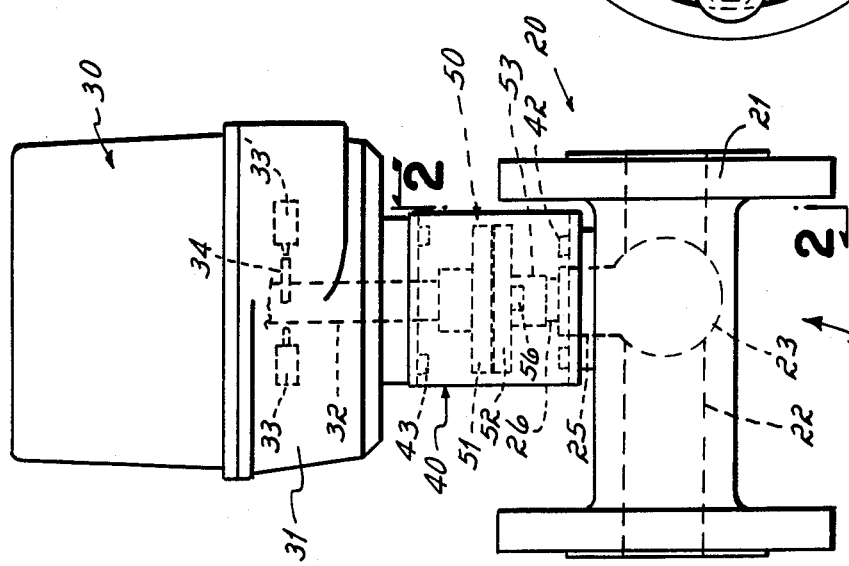

MOTOR OPERATED VALVE ASSEMBLY

The present invention relates to motor operated valves, and more particularly, to motor operated valves which are actuated by the turning of the rotatable valve stem by the rotary shaft of the motor.

Many types of valves are actuated through rotational movement of the valve stem. Such valves, for example, include ball valves, butterfly valves and plug valves. In the operation of such valves, as in ball valves for example, a valve stem is directly attached to the ball to turn the ball between a closed position in which all flow through the valve is completely blocked and an open position in which the flow through the valve is unrestricted or only minimally impeded.

With valves which are intended to be operated by hand, a handle attached to the outer end of the stem is provided to operate the valve by rotation of the stem. In hand operated valves, the extreme open and closed positions of the valve are determined by mechanically restricting the angular travel of the valve stem by a pair of stops fixed to the valve housing which restrict the travel of the handle. Selection of the valve-open and valve-closed positions is thus achieved by movement of the handle from a position against one stop or the other.

Many applications require that the valves of this type be motor operated. Motors used for this purpose, as with the handles on manually operated valves, must provide a means to limit the travel of the valve stem to the same extreme angular positions which correspond to the open and closed positions of the valve.

When motors are used, particularly electric motors, it is not desirable to employ mechanical stops on the valve housing to limit the angle of travel of the stem, because mechanical or electrical damage or excessive wear occurs to the valve and motor parts when the motor is driven against fixed mechanical stops. Instead of mechanical stops, such motors are often equipped with limit switches which serve to deactivate the motor when one or the other of the extreme angular positions is achieved. The switches are typically built into the motor circuitry within the motor housing and are arranged to limit the angular stroke of the motor itself to that required to move the valve between its two extreme positions. Most often the angle of travel between the two extreme positions of the valve stem is ninety degrees. By electrically stopping the motor at its predetermined extreme positions, the positioning of the valve stem, and thus the condition of the valve, are directly dependent on the angular position of the motor shaft.

As a result of the provision for electrical stops within the motor housing rather than mechanical stops on the valve housing, the proper positioning of the valve stem by the motor requires precise predetermination or calibration of the angular position of the limit switches, or cams for actuating the switches, within the motor housing with respect to the corresponding angular positions of the valve stem at the extreme open and closed positions of the valve. This calibration is complicated by the fact that usually the precise position of the motor and valve are not readily determinable visually with sufficient accuracy.

In the prior art, the initial setting of the angular relationship between the motor shaft and the valve stem has been acomplished by removal of the motor cover and the rotating of the positions of the limit switches, or cams for actuating those switches, with respect to the motor shaft. Then, the cover must be replaced and the motor operated to check the position, and the process repeated if necessary to achieve proper adjustment of the initial angular relationship between the motor shaft and the valve stem. The process is troublesome and time consuming.

It is an objective of the present invention to provide a more easily usable means for adjusting the initial angular relationship between the motor shaft and valve stem in a rotatably operable motorized valve. It is a more particular objective of the present invention to provide a means for adjusting the relative angular positions between the motor shaft and the valve stem in a motor operated valve which is usable to adjust the valve while the valve is assembled and operable without removing or loosening the valve motor from its mounting or removing the cover from the motor.

More particularly, it is an objective of the present invention to provide a motor operated valve with means for adjusting the relative angular positions between the motor shaft and the valve stem which includes an adjustable drive coupling which can be used to align the motor shaft while the motor shaft is resting at the angular position determined by its electrical limits and while the valve stem is set at the angular position of one of the valve's extreme settings as determined by the valve's internal configuration.

According to the objectives of the present invention, a motor operated valve is provided with a valve, a motor, a bracket configured to mount the motor and valve together with the valve stem and motor shaft in opposed alignment, and a two-piece coupling connected in line with the shaft and stem and having the two pieces angularly adjustable with respect to each other so that the angular relation between the stem and shaft can be set and then locked with the valve and motor otherwise in fully operable and assembled condition.

In accordance with the present invention, a motorized valve operable through the rotation of a rotary stem is provided with a motor support bracket for mounting a rotary motor with its output shaft in axial alignment with the valve stem and a two-piece angularly adjustable coupling connected between the shaft end and the end of the valve stem. The two pieces of the coupling have abutting surfaces rotatable with respect to each other to provide an angularly adjustable link. The surfaces are also radially toothed so as to lock in position when clamped together in the adjusted angular position.

These and other objectives and advantages of the present invention will be more readily apparent from the following detailed description of the drawings illustrating a preferred embodiment of the present invention in which:

FIG. 1 is a plan view showing a preferred embodiment of the invention in the form of a motor operated ball valve assembled in accordance with the principals of the present invention.

FIG. 2 is a cross-sectional view along the line 2—2 of FIG. 1.

FIG. 3 is a cross-sectional view along the line 3—3 of FIG. 2.

FIG. 4 is an exploded view of the coupling of the motor operated ball valve of FIG. 1.

Referring to FIG. 1, a motor operated valve assembly 10 is shown. The assembly 10 includes ball valve component 20, a motor 30, a bracket 40 which mounts the motor 30 upon the valve component 20, and a coupling 50 shown in FIG. 1 in phantom lines within the bracket 40 which drivably connects the motor 30 to the valve component 20.

The valve component 20 includes a valve housing 21 having a through-bore 22 interrupted by a valve ball 23. The ball 23 has therethrough a port (not shown) which, when aligned with the bore 22, constitutes the open condition of the valve, and when oriented across the bore 22 constitutes the closed position of the valve. Generally, the angular positions of the ball when the valve is in the opened and closed conditions are approximately ninety degrees apart. Attached rigidly to the valve ball 23 and projecting through and from the housing 21 is a valve stem 25. The stem 25 terminates in a keylike endpiece 26 for engagement with a mating piece from the drive coupling 50 described below.

The motor 30, in the embodiment of the valve 10 in which the present invention presents its best advantages, is typically electric. The motor 30 includes a motor housing 31 which has projecting therefrom an output or drive shaft 32. The motor housing 31 is rigidly mounted to the valve housing 21 through the bracket 40 which is bolted to the valve housing 21 by bolts 42, and to the motor housing 31 by bolts 43. The bracket 40 and the mounting holes for the bolts 42 and 43 are so configured as to present the motor shaft 32 in opposition to and in axial alignment with the valve stem 25.

Contained internally of the motor housing 31 there is typically a pair of electrical switches 33, 33' operable to control the limits of rotation of motor output shaft 32. These switches are typically actuated by a cam 34 fixed to the motor output shaft 32. By adjusting the positions of the switches 33, 33' relative to the cam 34, the limits of rotation of the motor output shaft are adjustable.

The coupling 50 is better illustrated in further detail by reference to FIG. 2. In FIG. 2, the valve housing 21, the motor housing 31, and the bracket 40 are shown. The valve stem 25 with its keylike endpiece 26 is shown extending from the valve housing 21. The stem 25 is rotatably mounted in the housing 21 so as to turn valve ball 23 between its extreme valve-open and valve-closed positions, in this case, by rotating through an arc of ninety degrees. Extending from the motor housing 31 is the motor output shaft 32 which is of a standard electric motor drive shaft configuration with its end having opposed planar parallel machined surfaces to drivably engage a similarly shaped mating hole in a drive pulley or drive coupling. The limit switches 33, 33' internal of its housing 31 are pre-positioned to limit the angular rotation of the shaft 32 to the same arc of travel as that of the valve stem 25, in this case, ninety degrees.

Aligned on the common axis of the shaft 32 and stem 25 and connected therebetween is the coupling 50. The coupling 50 is made up of two pieces 51 and 52. The first piece, the motor engaging piece 51, is rigidly clamped to the motor drive shaft 32 so as to be rotatably driven by the rotation of the motor shaft 32. The second piece, the valve stem engaging piece 52, has an end 53 which is keyed so as to mate with and drivably engage the key 26 of the valve stem 25. Otherwise, the piece 52 is held in engagement with the stem 25 by the confinement of the coupling 50 maintained by the rigid assembly of the bracket 40 with the motor 30 and valve section 20. The pieces 51 and 52 join to each other through radially toothed planar surfaces 54 and 55, respectively, each lying in a plane perpendicular to the common axis of the valve stem 25, motor shaft 32 and coupling 50. Locking bolts 56 are provided threaded into the piece 51 and extending through arcuate slots 57 in the piece 52 to lock the pieces together when tightened, but to allow the pieces 51 and 52 to be rotated with respect to each other for adjustment when the bolts 56 are loosened. The locking structure is better shown by further reference to FIG. 3.

Referring to FIG. 3, the valve stem engaging piece 52 is shown having therein arcuate slots 57 through which the bolts 56 extend. In section, the key end 26 of the valve stem 25 is shown keyed to the slot in the keyed end 53 of the piece 52.

By reference to the exploded view of Figure 4, the adjustment of the coupling can be better understood. In FIG. 4, the piece 51, having therein a drive shaft receiving hole 58, is shown. Through the toothed surface 54 thereof are a pair of tapped holes 59 for receiving the locking bolts 56. In assembly, the bolts 56 extend through the slots 57, which are slightly oversized in relation to the bolts 56 so as to allow free rotation of the pieces 51 and 52 with respect to each other when the bolts 56 are loosened. The opposed surfaces 54 and 55 of the pieces 51 and 52 of the coupling 50 have radially extending teeth 60 found thereon so as to lock positively to each other and retain their angular position after adjustment when locked together by the tightened bolts 56.

The procedure for proper adjustment of the angular relationship of the shaft 32 with the stem 25 can be accomplished with the valve 10 fully assembled. The valve 10 is to be in the full open position. The adjustment is done by loosening the locking bolts 56 and then positioning the valve stem so that valve component 20 is in full open position as desired. When the angular position of the stem 25 and motor shaft 32 are correct, then the pieces 51 and 52 can be locked together by a tightening of the bolts 56. The procedure is simple and may be accomplished quickly. Since the limit switches within the motor 30 have been preset to the same angular spacing as the extreme positions of the valve, in this case ninety degrees, the second relative position is simultaneously aligned in one setting of the coupling 50.

While I have described only a single preferred embodiment of my invention, persons skilled in the art will appreciate numerous changes and modifications which may be made without departing from the spirit of my invention. For example, the valve has been desdribed as a ball valve, but other styles and types of valves may readily be used in lieu of the ball valve. Therefore, I do not intend to be limited except by the scope of the following appended claims.

I claim:

1. A motor operated valve assembly comprising:
   a valve housing
   a rotatable valve contained within said housing, said valve being movable between a fully open and a fully closed position,
   a valve stem carried by said rotatable valve and extending from said housing,
   a bracket rigidly mounted on said valve housing,
   a motor rigidly mounted to said bracket and having a rotatable output shaft extending toward and in axial alignment with said valve stem, said motor having a motor housing and switches contained internally of said motor housing for delineating the fully open and fully closed position of said valve, and a coupling having an axis in axial alignment with said shaft and having first and second pieces both axially adjustable and angularly adjustable with respect to each other, said first piece being drivably connected to said shaft and said second piece being drivably connected to said stem, said coupling pieces being axially movable into driving engagement with each other after said motor has been moved to one limit of its travel as determined by said switches and said valve has been moved to one of its fully open or fully closed positions.

2. The motor operated valve of claim 2 wherein said coupling comprises means for rigidly clamping said first piece of said coupling to said shaft.

3. The motor operated valve of claim 1 wherein said motor is an electrical motor and said switches are electrical switches.

4. The method of adjusting a motor output shaft of a motor operated valve assembly relative to a valve of the valve assembly, which valve assembly comprises a valve housing, a rotatable valve contained within the housing and movable between a fully open and a fully closed position, a valve stem carried by the rotatable valve and extending from the housing, a bracket mounted upon the valve housing, a motor mounted upon the bracket and having a rotatable output shaft extending toward and in axial alignment with the valve stem, said motor having a housing and switches contained internally of said motor housing for delimiting the fully open and fully closed positions of said valve, and a coupling in axial alignment with said shaft and said stem, said coupling having first and second pieces angularly adjustable with respect to each other, said first pieces of said coupling being drivably connected to said shaft and said second piece of said coupling being drivably connected to said stem, which method comprises disconnecting said first and second pieces of said coupling, moving said motor to one limit of its travel as determined by one of said switches, moving said valve to one of its fully open or fully closed positions, and connecting said first piece of said coupling to said second piece of said coupling with said motor at one limit of its travel and said valve in one of its fully open or fully closed positions.

5. A motor operated valve assembly comprising:
a valve housing,
a rotatable valve contained within said housing, said valve being movable between a fully open and a fully closed position,
a valve stem carried by said rotatable valve and extending from said housing,
a bracket rigidly mounted on said valve housing,
a motor rigidly mounted to said bracket and having a rotatable output shaft extending toward and in axial alignment with said valve stem, said motor having a motor housing and switches contained internally of said motor housing for delineating the fully open and fully closed position of said valve, and a coupling having an axis in axial alignment with said shaft and having first and second pieces both axially adjustable and angularly adjustable with respect to each other, said first piece being drivably connected to said shaft and said second piece being drivably connected to said stem, said coupling pieces being axially movable into driving engagement with each other after said motor has been moved to one limit of its travel as determined by said switches and said valve has been moved to one of its fully open or fully closed positions, each of said pieces of said coupling having a radially extending facial surface, each of said facial surfaces having radially extending teeth thereon, said radially extending teeth of said first piece of said coupling being in opposed engagement with the teeth of said second piece, and means for locking said teeth of said pieces together to angularly align said shaft and said stem.

6. The motor operated valve of claim 5 wherein said locking means comprises at least one locking screw extending through an arcuate slot of one of said pieces and into a threaded bore in the other of said pieces.

7. A motor operated valve assembly comprising:
a valve housing,
a rotatable valve contained within said housing, said valve being movable between a fully open and a fully closed position,
a valve stem carried by said rotatable valve and extending from said housing,
a bracket rigidly mounted on said valve housing,
a motor rigidly mounted to said bracket and having a rotatable output shaft extending toward and in axial alignment with said valve stem, said motor having a motor housing and switches contained internally of said motor housing for delineating the fully open and fully closed position of said valve, and a coupling having an axis in axial alignment with said shaft and having first and second pieces angularly adjustable with respect to each other about said axis, said first piece being drivably connected to said shaft and said second piece being drivably connected to said stem, said coupling enabling said motor output shaft to be drivingly secured to said valve stem when said motor is at one limit of its travel as determined by said switches and said valve is at one of its fully open or fully closed positions, each of said pieces of said coupling having a radially extending facial surface, each of said facial surfaces having radially extending teeth thereon, said radially extending teeth of said first piece of said coupling being in opposed engagement with the teeth of said second piece, and means for locking said teeth of said pieces together to angularly align said shaft and said stem, said locking means comprising at least one locking screw extending through an arcuate slot of one of said pieces and into a threaded bore in the other of said pieces.

* * * * *